US010620836B2

(12) United States Patent
Ren et al.

(10) Patent No.: US 10,620,836 B2
(45) Date of Patent: Apr. 14, 2020

(54) METHOD AND APPARATUS FOR DETERMINING MEDIA INFORMATION ASSOCIATED WITH DATA STORED IN STORAGE DEVICE

(71) Applicant: ALIBABA GROUP HOLDING LIMITED, George Town, Grand Cayman (KY)

(72) Inventors: Wanxi Ren, Hangzhou (CN); Kai Zhu, Hangzhou (CN); Yong Jiang, Hangzhou (CN); Xing Yang, Hangzhou (CN); Huawei Long, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 14/864,038

(22) Filed: Sep. 24, 2015

(65) Prior Publication Data
US 2016/0092111 A1    Mar. 31, 2016

(30) Foreign Application Priority Data

Sep. 28, 2014   (CN) .......................... 2014 1 0509618

(51) Int. Cl.
| G06F 3/06 | (2006.01) |
|---|---|
| G06F 16/00 | (2019.01) |
| G06F 16/13 | (2019.01) |

(52) U.S. Cl.
CPC ............ *G06F 3/0607* (2013.01); *G06F 3/065* (2013.01); *G06F 3/068* (2013.01); *G06F 3/0611* (2013.01);
(Continued)

(58) Field of Classification Search
CPC combination set(s) only.
See application file for complete search history.

(56) References Cited

U.S. PATENT DOCUMENTS

| 6,292,805 B1 * | 9/2001 | Basso ............... G06F 17/30858 |
| 7,245,819 B1 * | 7/2007 | Sanders ............... G11B 27/034 |
| | | 386/241 |

(Continued)

FOREIGN PATENT DOCUMENTS

| CN | 1258071 A | 6/2000 |
| CN | 1325532 A | 12/2001 |

(Continued)

OTHER PUBLICATIONS

PCT International Search Report and Written Opinion dated Jan. 20, 2016, issued in corresponding International Application No. PCT/US15/52010 (11 pages).

(Continued)

*Primary Examiner* — Yong J Choe
(74) *Attorney, Agent, or Firm* — Finnegan, Henderson, Farabow, Garrett & Dunner, LLP

(57) ABSTRACT

Systems and methods are provided for determining identifier information associated with media content stored in a storage device; wherein the storage device comprises a plurality of clusters and stores a media file including media content and identifier information associated with the media content, the media content and the identifier information being stored in a plurality of data units distributed among the plurality of clusters. The method comprises: determining, when a data unit is read, a first identifier associated with a first target cluster that stores the data unit being read; determining a second identifier associated with the first identifier, the second identifier being associated with a second target cluster that stores a data unit that stores the identifier information; and obtaining, based on the second identifier, the identifier information associated with the media content.

21 Claims, 6 Drawing Sheets

(52) U.S. Cl.
 CPC .......... *G06F 3/0619* (2013.01); *G06F 3/0643* (2013.01); *G06F 16/00* (2019.01); *G06F 16/13* (2019.01)

(56) References Cited

U.S. PATENT DOCUMENTS

| | | | |
|---|---|---|---|
| 7,814,078 B1* | 10/2010 | Forman | G06F 17/30486 707/698 |
| 8,972,353 B1* | 3/2015 | Sharma | G06F 17/30088 707/640 |
| 2005/0050108 A1 | 3/2005 | Sawant et al. | |
| 2008/0016266 A1* | 1/2008 | Liu | G06F 3/0607 710/311 |
| 2010/0268902 A1 | 10/2010 | Drobychev et al. | |
| 2011/0072078 A1 | 3/2011 | Chai et al. | |
| 2011/0191447 A1* | 8/2011 | Dazzi | G06F 15/16 709/219 |
| 2013/0054683 A1* | 2/2013 | Rothschild | H04L 67/1097 709/203 |

FOREIGN PATENT DOCUMENTS

| | | |
|---|---|---|
| CN | 101286157 A | 10/2008 |
| CN | 101719913 A | 6/2010 |
| JP | 2001236251 A | 8/2001 |
| JP | 2002244915 A | 8/2002 |
| JP | 2005535018 A | 11/2005 |
| JP | 2008011235 A | 1/2008 |
| JP | 2012069004 A | 4/2012 |
| KR | 100916189 B1 | 9/2009 |
| WO | WO 2016/049350 A1 | 3/2016 |

OTHER PUBLICATIONS

First Chinese Office Action issued in Chinese Application No. 201410509618.0, dated Apr. 23, 2018 (5 pages).
First Chinese Search Report issued in Chinese Application No. 201410509618.0, dated Apr. 3, 2018, (1 page).
Anonymous: "File Allocation Table—Wikipedia, the free encyclopedia," Retrieved from the Internet URL: https://web.archive.org/wiki/File_Allocation_Table, 26 pages (2014).
Communication Pursuant to Article 94(3) EPC issued in EPO Application No. 15844913.2 dated Jan. 8, 2019 (8 pages).
Office Action issued from the Japanese Patent Office in corresponding Japanese Application No. 2017-515690, dated Aug. 22, 2019 (4 pgs.).
Japanese Search Report issued in Japanese Application No. 2017-515690 dated Jul. 22, 2019, 37 pages.

* cited by examiner

METHOD AND APPARATUS FOR DETERMINING MEDIA INFORMATION ASSOCIATED WITH DATA STORED IN STORAGE DEVICE

CROSS-REFERENCE TO RELATED APPLICATION

This application is based upon and claims priority to Chinese Patent Application No. 201410509618.0, filed Sep. 28, 2014, the entire content of which is incorporated herein by reference.

TECHNICAL FIELD

The present disclosure generally relates to the field of media information processing and, more particularly, to a method and an apparatus for determining information associated with media data stored in a storage device.

BACKGROUND

Nowadays, large display screens are widely used to display information at public places such as shopping malls, name brand stores, subways, airports, etc. The large display screens typically receive the media information from playback devices, which in turn acquire the media information from removable storage devices, such as Universal Serial Bus (USB) drive, Secure Digital (SD) card, etc. Media files can be written into these storage devices with a personal computer (PC). The storage devices can be connected to the playback devices to play the media files. The storage devices can also be internal to the playback devices.

When a playback device plays a media file stored in the storage device, it may be necessary for the storage device to determine which part of the media file is being read and displayed by the playback device. For example, the storage device may need to determine a reading progress of the media file. The storage device may also need to provide some additional information about the media content that is currently being displayed to other terminal devices. For example, if the media content depicts a product, the storage device may need to provide the name of the product and the web address of a web page associated with the product.

However, typically the storage device only reads and writes the media file as data blocks, and do not have information, such as file name, that enables the storage device to identify which data block belongs to a particular media file. The file system information (e.g., file handles, file locations, other information for accessing the files, etc.) is typically available only to the operating system running on the playback device. Therefore, the storage device typically cannot determine which part of the media file is being read and displayed, and cannot provide additional information about the media content that is currently being displayed.

SUMMARY

Embodiments of the present disclosure provide a computer-implemented method for determining identifier information associated with media content stored in a storage device. The storage device comprises a plurality of clusters and stores a media file including media content and identifier information associated with the media content, the media content and the identifier information being stored in a plurality of data units distributed among the plurality of clusters. The method comprises: determining, when a data unit is read, a first identifier associated with a first target cluster that stores the data unit being read; determining a second identifier associated with the first identifier, the second identifier being associated with a second target cluster that stores a data unit that stores the identifier information; and obtaining, based on the second identifier, the identifier information associated with the media content.

In some embodiments, the method further comprises creating a lookup table. The lookup table stores identifiers associated with at least some of the plurality of clusters. The lookup table also stores the second identifier. At least one of the identifiers is associated with the second identifier in the lookup table.

In some embodiments, the creation of a lookup table comprises the following steps: traversing a file allocation table to acquire the identifiers; associating one of the identifiers with each of the identifiers in the lookup table; and associating the second identifier with the one of the identifiers. The second identifier is determined by locating the one of the identifiers in the lookup table based on the first identifier, and locating the second identifier in the lookup table based on the one of the identifiers.

In some embodiments, the identifiers include a third identifier and a fourth identifier; wherein the third identifier is associated with a cluster that stores a data unit at a head location of the media file; and wherein the fourth identifier is associated with a cluster that stores a data unit included in a tail location of the media file. In some embodiments, each of the at least some of the plurality of clusters is separated by a pre-determined number of clusters.

In some embodiments, the creation of the lookup table comprises the following steps: detecting a writing operation at the storage device; responsive to the detection of writing operation, detecting one or more changes in the file allocation table; and updating the lookup table to reflect the one or more changes in the file allocation table.

In some embodiments, the plurality of data units store a plurality of media contents; the data unit that stores identifier information associated with the plurality of media contents also stores information about the physical locations of the plurality of media contents in the media file. Each of the data units of the media file is associated with a sequence number, the sequence number indicating an order of the data units in the media file. The lookup table also stores the sequence numbers. The method further comprises: determining, from the lookup table, a first sequence number associated with the data unit being read; determining a first physical location of the data unit being read based on the first sequence number and a data capacity of a cluster; comparing the physical locations of the plurality of media contents against the first physical location to find a match; and obtaining the identifier information associated with the matching media content.

In some embodiments, the plurality of data units store a plurality of media contents; wherein the data unit that stores identifier information associated with the plurality of media contents also stores information about the physical locations of the plurality of media contents in the media file. Each of the data units of the media file is associated with a sequence number, the sequence number indicating an order of the data unit in the media file. The lookup table stores the sequence numbers. The method further comprises: determining a first physical location of the data unit being read based on a location of the first target cluster in a file allocation table; comparing the physical locations of the plurality of media contents against the first physical location to find a match; and obtaining the identifier information associated with the matching media content.

In some embodiments, the method further comprises: recording a reading time associated with the reading of the data unit; determining a time difference between a reading and a playing of the media file; determining a data unit being played based on the recorded reading time, and the determined time difference; and obtaining identifier information associated with the data unit being played.

In some embodiments, the method further comprises: determining information associated with the media content based on the identification information; and transmitting the information in response for a request for information associated with the media content.

Embodiments of the present disclosure also provide a computer-implemented method for determining information about a playing operation of a media file stored in a storage device; wherein the storage device stores a media file that includes a plurality of data units. The method comprises: determining that a data unit is read at a preset sample time point; and determining an actual playback time for the data unit at a playback device based on a time difference between a reading time and a playback time of the playback device, and based on the sample time point.

In some embodiments, the method further comprises: obtaining an actual playback time that matches with a current time; and determining a data unit that is read at a sample time point that corresponds with the matching actual playback time, based on the time difference.

Embodiments of the present disclosure also provide a computer-implemented method for determining playback time information of a media file stored in a storage device and to be played at a playback device; wherein the media file includes a plurality of media contents and a start time point for each of the media contents. The method comprises: detecting a first reading operation for first media content; detecting a second reading operation for second media content, the second media content being stored adjacent to the first media content in the media file; acquiring a first absolute time point when the first reading operation starts; acquiring a second absolute time point when the second reading operation starts; calculating a first difference between the first absolute time point and the second absolute time point; acquiring a first start time point of the first media content and a second start time point of the second media content from the storage device; calculating a second difference between the first start time and the second start time by a calculation; determining a third difference between the second difference and the first difference; and determining the third difference as a time difference between a reading time and a playback time of the playback device.

Embodiments of the present disclosure also provide an apparatus for determining identifier information associated with media content stored in a storage device; wherein the storage device comprises a plurality of clusters and stores a media file including media content and identifier information associated with the media content, the media content and the identifier information being stored in a plurality of data units distributed among the plurality of clusters. The apparatus comprises a processor being configured to: determine, when a data unit is read, a first identifier associated with a first target cluster that stores the data unit being read; determine a second identifier associated with the first identifier, the second identifier being associated with a second target cluster that stores a data unit that stores the identifier information; and obtain, based on the second identifier, the identifier information associated with the media content.

In some embodiments, the processor is further configured to create a lookup table; wherein the lookup table stores identifiers associated with at least some of the plurality of clusters; wherein the lookup table also stores the second identifier; wherein at least one of the identifiers is associated with the second identifier in the lookup table.

In some embodiments, the plurality of data units store a plurality of media contents; wherein the data unit that stores identifier information associated with the plurality of media contents also stores information about the physical locations of the plurality of media contents in the media file; wherein each of the data units of the media file is associated with a sequence number, the sequence number indicating an order of the data units in the media file; wherein the lookup table stores the sequence numbers; wherein the processor is further configured to; determine, from the lookup table, a first sequence number associated with the data unit being read; determine a first physical location of the data unit being read based on the first sequence number and a data capacity of a cluster; compare the physical locations of the plurality of media contents against the first physical location to find a match; and obtain the identifier information associated with the matching media content.

In some embodiments, the processor is further configured to: record a reading time associated with the reading of the data unit; determine a time difference between a reading and a playing of the media file; determine a data unit being played based on the recorded reading time, and the determined time difference; and obtain identifier information associated with the data unit being played.

In some embodiments, the processor is further configured to: determine information associated with the media content based on the identification information; and transmit the information in response for a request for information associated with the media content.

Embodiments of the present disclosure also provide an apparatus for determining information about a playing operation of a media file stored in a storage device; wherein the storage device stores a media file that includes a plurality of data units. The apparatus comprises a processor being configured to: determine that a data unit is read at a preset sample time point; and determine an actual playback time for the data unit at a playback device based on a time difference between a reading time and a playback time of the playback device, and based on the sample time point.

In some embodiments, the processor is further configured to: obtain an actual playback time that matches with a current time; and determine a data unit that is read at a sample time point that corresponds with the matching actual playback time, based on the time difference.

Embodiments of the present disclosure also provide an apparatus for determining playback time information of a media file stored in a storage device and to be played at a playback device; wherein the media file includes a plurality of media contents and a start time point for each of the media contents; the apparatus comprises a processor being configured to: detect a first reading operation for first media content; detect a second reading operation for second media content, the second media content being stored adjacent to the first media content in the media file; acquire a first absolute time point when the first reading operation starts; acquire a second absolute time point when the second reading operation starts; calculate a first difference between the first absolute time point and the second absolute time point; acquire a first start time point of the first media content and a second start time point of the second media content from the storage device; calculate a second difference between the first start time and the second start time by a calculation; determine a third difference between the second difference and the first difference; and determine the third difference as a time difference between a reading time and a playback time of the playback device.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Figure 1:
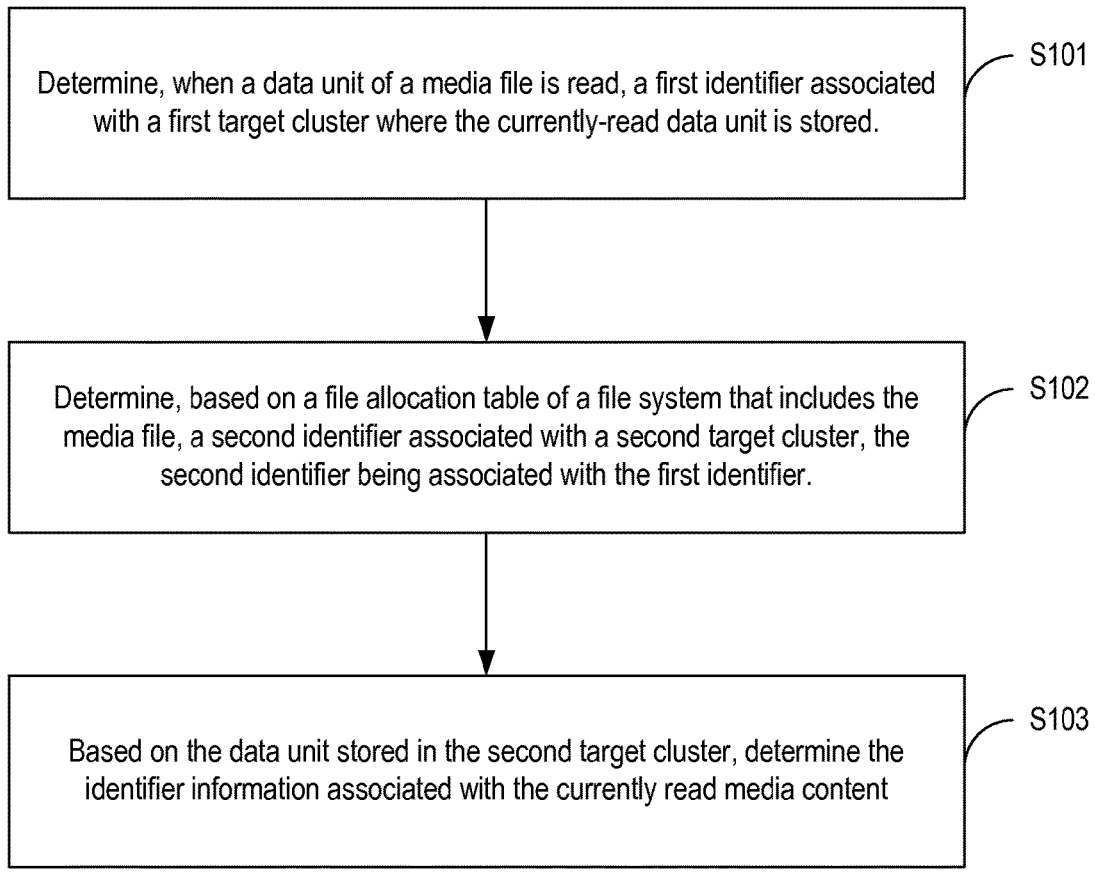
FIG. 1 is a flowchart of an exemplary method for determining media information associated with data being accessed from a storage device, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide methods and apparatuses for determining identifier information associated with media content stored in a storage device. For a media file including multiple data units is distributed among a plurality of clusters of a storage device, when a first cluster associated with a first identifier is read, a second cluster associated with a second identifier that stores identifier information of the media file can be located, based on an association between the first and the second identifiers, and the identifier information associated with the media content can be obtained. Moreover, when a timing difference between a reading time and a playback time is known, the portion of media data being current displayed can be determined, and the associated identifier information can be obtained as well.

In the embodiments of the present application, identifier information associated with media contents can be added into the media file data, which can then include the data of the media content and identifier information associated with the media content. The location where the identifier information is to be added into the file data can be selected in different situations. For example, to avoid affecting the playing of the media file, the identifier information can be added at a tail location of the media file. Besides, typically media files include certain description information at a head location of the files. The description information can indicate a type and a size of the file. The head location of the media files can also include some reserved fields, and the identifier information can be added to those fields as well.

Accordingly, the media files stored in the storage device are special files including identifier information associated with the media content stored in the media files. Since a storage device stores and distributes file data among clusters, the media file data is generally divided into a plurality of data units according to a data storage capacity of each cluster. Each of the data units is assigned a sequence number to reflect the sequence of the data units in the media file. The numbers can be successive or non-successive, as long as they follow a certain order to reflect the sequence of the data units. The data units are stored and distributed among the clusters. In this way, the identifier information associated with the media content can be stored in one of the data units that is associated with a predetermined sequence number (e.g., the final data unit of the file).

When the data stored in the storage device is accessed by the playback device, the storage device can detect a cluster that is being accessed. Embodiments of the present disclosure enable reversely searching of information about the file associated with that cluster. Taking a certain media.avi file as an example, the file is stored in clusters {C (4), (C (7), C (8) . . . C (n)} of the storage device (generally under the 32-Bit File Allocation Table (FAT32) format). When the storage device detects that a cluster C (m) is read, embodiments of the present disclosure enables determination of information associated with the data unit stored in cluster C (m).

In a storage device (e.g., a hard disk drive), data is stored in partitions of a magnetic disc. One partition is divided into clusters of the same size, and each cluster includes a number of contiguous blocks and is associated with a cluster number. The cluster size can vary according to a type of the File Allocation Table (FAT) system, and the size of a partition. Typically, a size of a cluster falls between 2 KB and 32 KB. A media file stored in such a storage device may be distributed among more than one cluster, depending on the size of the file. A cluster chain can be used to represent the media file with a sequence of clusters that store, sequentially, different units of the media file data. Clusters of the sequence typically do not neighbor with each other but are scattered within the storage device. When a file is distributed among the clusters, a file allocation table (e.g. a table structure defined under FAT) can be generated.

A FAT table includes entries for all the clusters of a partition, and then store information about a cluster chain of a file. Each entry is associated with an entry number that corresponds to the location of the entry within the table. One of the entries of the table stores information about the Root Directory. The information includes a cluster number associated with the first cluster that stores a first portion of the media file. The other entries of the table can correspond to the clusters, with the associated entry numbers associated with the cluster numbers. The entry numbers are typically shifted (e.g., with an offset of 2) from the corresponding cluster numbers. For example, entry number 3 corresponds to cluster number 1.

A plurality of portions of a file can be distributed among the clusters. In that case, an entry of the table that corresponds to a cluster storing a portion of the file can store an entry number that corresponds to the subsequent cluster that stores the next portion of the file. A combination of the entries can then be used to represent a cluster chain.

Table 1 below illustrates an exemplary FAT table provided to illustrate the aforementioned mechanism:

TABLE 1

| | | Root Directory | | | | |
|---|---|---|---|---|---|---|
| 0xF8FFFF0F | 0xFFFFFFFF | | 4 | 5 | 7 | 0 |
| 10 | 0 | 0 | 11 | 26 | 0 | 0 |
| 0 | 0 | 0 | 0 | 0 | 0 | 0 |
| 0 | 0 | 0 | 0 | 0 | 0x0FFFFFFF | 0 |

Table 1 includes 28 entries. Each entry is associated with an entry number that corresponds to its location in the table. For example, the entry storing "0xF8FFFF0F" is associated with entry number 0, the entry storing "0xFFFFFFFF" is associated with entry number 1, the entry storing the Root Directory is associated with an entry number 2, the entry storing "4" is associated with entry number 3, the entry storing "10" is associated with entry number 7, and the entry storing "0x0FFFFFFF" is associated with entry number 26, etc.

Starting from the fourth entry, each entry also corresponds to a cluster. The entry number corresponds to a cluster number with an offset of 2. As an illustrative example, file data are to be distributed, sequentially, at clusters associated with cluster numbers 1, 2, 3, 5, 9, and 24. The Root Directory of Table 1 stores the information indicating that the first data unit of the file is stored at cluster number 1. Entry number 3 of the FAT table corresponds to cluster number 1, and the associated entry stores a number (number 4 in this example) that corresponds to the next cluster (associated with cluster number 2, with an offset of 2) that stores the second data unit of the file. Therefore, the entry stores a "4" to indicate the next cluster is associated with cluster number 2. Likewise, entry number 4 of the FAT table stores a number (number 5 in this example) that corresponds to the next cluster (associated with cluster number 3, with an offset of 2) that stores the third data unit of the file. Therefore, the entry stores a. "5" to indicate that the next cluster is associated with cluster number 3. Entry number 5 of the FAT table stores a number (number 7 in this example) that corresponds to the next cluster (associated with cluster number 5, with an offset of 2) that stores the fourth data unit of the file. Entry number 7 stores a number (number 10 in this example) that corresponds to the next cluster (associated with cluster number 8) that stores the fifth data unit of the file. Entry number 10 stores a number (number 11 in this example) that stores the sixth data unit of the file. Entry number 11 stores a number (number 26 in this example) that stores the last data unit of the file. Finally, entry number 26 stores an end-of-file marker to indicate that the corresponding cluster (associated with cluster number 24) stores the last data unit of the file.

Based on the information from the table, it can be determined that the first data unit of the file is stored at a cluster associated with cluster number 1, the second data unit of the file is stored at a cluster associated with cluster number 2, the third data unit of the file is stored at a cluster associated with cluster number 3, the fourth data unit of the file is stored at a cluster associated with cluster number 5, the fifth data unit of the file is stored at a cluster associated with cluster number 8, the sixth data unit of the file is stored at a cluster associated with cluster number 9, and the seventh data unit of the file is stored at a cluster associated with cluster number 24.

As can be seen from the above descriptions, after determining a cluster number associated with a cluster that stores a data unit of the file being accessed by the playback device, the storage device can also locate, with the FAT table, the clusters that store the first data unit and the last data unit of the file. Also, as described before, the head part or the tail part of a media file can include identifier information associated with the media content of the file. Therefore, by reading a cluster that stores the data unit associated with the aforementioned predetermined sequence number (i.e., the data pre-selected to include the identifier information), the storage device can also determine the identifier information. The storage device than then provide the identifier information to an external terminal device upon request.

Reference is now made to FIG. 1, which illustrates an exemplary method 100 for determining media information associated with data being accessed from a storage device, according to embodiments of the present disclosure. The method can be performed by a system which can be a storage device or have access to the storage device. The storage device includes a plurality of clusters. The storage device stores a media file, which includes data for media content and identifier information associated with the media content. The media file data includes a plurality of data units. Each of the data units is associated with a sequence number to reflect the sequence of the data units in the media file. The data units are stored and distributed among the plurality of clusters of the storage device. The identifier information associated with the media content can be included in a pre-selected data unit associated with a pre-determined sequence number. Referring to FIG. 1, method 100 includes the following steps.

In step S101, when a data unit of the media file is read, the system determines a first identifier associated with a first target cluster where the currently-read data unit is stored.

In step S102, the system determines, based on a file allocation table (e.g. FAT) of a file system that includes the media file, a second identifier associated with a second target cluster, the second identifier being associated with the first identifier. The data units stored in the first target cluster and the second target cluster are associated with the same media file. The second target cluster stores the pre-selected data unit that includes the identifier information and is associated with the pre-determined sequence number.

In some cases, the data unit stored in the currently-read cluster may be part of content data of the media file. In this case, the currently-read cluster may not include the identifier information associated with the media content, which is stored in a different part of the file (e.g., at the tail location of the media file, to avoid affecting the playing of the file). As a result, the system cannot directly acquire the identifier information from the currently-read media content. However, since the identifier information associated with the media content is included in the media file data, and the data unit including the identifier information is also stored as part of the media file at a specific cluster, the system can acquire the identifier information by locating that specific cluster.

Specifically, after determining the first identifier of the first target cluster (for example, a cluster number) that is being read, the system can also locate the cluster that stores the data unit associated with the predetermined sequence number (e.g., the second target cluster). One way of locating the second target cluster is by traversing the FAT table. For example, by taking each cluster as a unit, the system can read entries of the table into an internal memory and analyze them. The system can also traverse the cluster chain and record the entries along the chain in the internal memory. For example, after the system detects c(m) (the cluster number associated with the cluster that stores the currently-read data), the system can acquire c(1), the cluster that stores the first data unit of the file. From c(1), the system can traverse the cluster chain until it reaches c(n), the cluster that stores the last data unit of the file, to search for c(m). During the searching and traversing, since it is not certain whether c(m) can be found, the cluster chain information of all the files need to be stored in the internal memory. As a result, such an algorithm consumes too much of internal memory spaces, and the algorithm is not preferable especially when the internal memory has little space. If the result of the traversal is not stored in the memory, a backing tracking IO problem can occur after c(m) is found.

To reduce requirement for internal memory, embodiments of the present disclosure provide a method of, based on the cluster number associated with the cluster that stores the currently-read data of a file, locating the cluster numbers associated with the clusters that store the first and the last data units of that file. A fast lookup table associated with the FAT table can be created and stored in the storage device. Furthermore, in order to prevent the fast lookup table from being deleted by mistake, a hidden partition can be created in the storage device to store the fast lookup table.

The fast lookup table can be created by traversing a FAT table. The traversing of the FAT table can occur once after each time the storage device (or the system) is powered on. Subsequently, once the system detects that the data stored at a certain cluster is being read, the system can search the fast lookup table to locate the clusters that store the first and the last data units of the file whose data is being read. The fast lookup table can store a target cluster identifier (e.g., a cluster number) that is associated with each of the cluster identifiers, and the data units associated with each cluster identifier belong to the same media file. The target cluster (associated with the target cluster identifier) can store the data unit associated with the predetermined sequence number (that is, the data unit that stores the identifier information associated with the media content). For example, the target cluster can store the first or the last data units of the media file.

In some embodiments, the fast lookup table can also store the sequence numbers associated with the data units (within the media file) stored in each cluster. Such an arrangement can provide the location of the currently-read data unit within the media file, under certain circumstances. For example, a certain AVI (Audio Video Interleaved) file has a size of 10 Mb. Based on the sequence number associated with the currently-read cluster, it can be determined that the currently-read data is located between the 5 Mb and 6 Mb of the file.

Table 2 below illustrates an exemplary fast lookup table structure provided to illustrate the aforementioned mechanism. The information in Table 2 corresponds to Table 1.

TABLE 2

| Cluster identifier (e.g., x) | Cluster identifier of the first data unit of the media associated with cluster identifier x | Data unit number in the media file associated with cluster identifier x | Cluster identifier of the last data unit of the media file associated with cluster identifier x |
|---|---|---|---|
| 0 | | | |
| 1 | 1 | 1 | 24 |
| 2 | 1 | 2 | |
| 3 | 1 | 3 | |
| 4 | | | |
| 5 | 1 | 4 | |
| 6 | | | |
| 7 | | | |
| 8 | 1 | 5 | |
| 9 | 1 | 6 | |
| ... | | | |
| 24 | 1 | 7 | |
| ... | | | |

As an illustrative example, if the cluster identifier associated with the currently accessed data is known (for example, cluster number 5), the system can access the fast lookup table to determine that the cluster identifier of the first data unit in the file associated with the accessed data is cluster number 1, the cluster identifier of the last data unit is cluster number 24, and the data stored in the cluster associated with cluster number 5 is the $4^{th}$ data unit in the file.

It should be noted that, in Table 2, each cluster identifier (in the first column) is associated with the cluster identifier of the first data unit in the media file, but only the cluster identifier of the first data unit is associated with the cluster identifier of the last data unit. That is because, when traversing the FAT table, the system cannot obtain the cluster identifier of the last data unit until it detects the end of the file. If each cluster identifier is to be associated with the cluster identifier of the last data unit, backtracking may be needed, which can take a long time. Therefore, in the preferred embodiment of the present disclosure, information about the cluster identifier of the last data unit is only stored in the same row as the cluster identifier of the first data unit. Thus, when the data stored in other clusters associated with the same file is read, the system first finds the row within Table 2 that corresponds to the cluster identifier of the currently-read cluster. Within that row, the system can find the cluster identifier of the first data unit of the file (from the second column). And then the system can find the row that corresponds to the cluster identifier of the first data unit of the file (from the second row). Within that row, the system can find the cluster identifier of the last data unit of the file (from the fourth column).

When creating the fast lookup table, the system can traverse, for each cluster number, the FAT table to determine the cluster number of the first data unit of a file distributed among the clusters associated with the cluster numbers. After locating the cluster number of the last data unit of the file, the system can then store that cluster number as an end cluster identifier in the same row as the cluster number of the first data unit.

That is to say, in the preferred implementation, in creating the fast lookup table, the system first traverses a file allocation table (e.g. FAT), and then determines a start cluster identifier of the media file associated with the data unit stored in each cluster identifier (the start cluster is used for storing the first data unit in the media file). Then, the start cluster identifier of the media file is recorded into a first field of each entry of the fast index table associated with each cluster identifier. Then, if a certain cluster identifier is determined as an end cluster of the media file (the end cluster is used for storing the last data unit in the media file) during traversing, the end cluster identifier is recorded into a second field of the entry of the fast index table associated with the start cluster of the media file.

Embodiments of the present disclosure further provide a method of determining the cluster identifier of the data unit associated with a predetermined sequence number in a media file (i.e., the data unit that stores the identification information) from the aforementioned fast lookup table as follows:

Firstly, the system determines a first target entry where a first identifier associated with the first target cluster is located.

Secondly, the system determines a start cluster identifier of the media file associated with the first target cluster based on a first field of the first target entry.

Thirdly, the system determines a second target entry where the start cluster identifier is located.

Finally, the system determines an end cluster identifier of the media file associated with the first target cluster based on a second field of the second target entry. The end cluster identifier can be associated with the cluster that stores the identification information (e.g., the second target cluster).

The fast lookup table allows the system to efficiently locate a cluster that stores a data unit associated with the predetermined sequence number, based on the cluster number associated with a cluster that is being read.

In some embodiments, the aforementioned fast lookup table can be created when the storage device is connected to the playback device and starts to be powered on. Interaction with a user terminal device is not required to create the table. To reduce the time required to build the table, two fast lookup tables of different granularities can be created. First, a first fast lookup table can be created for a set of cluster identifiers that meet certain preset conditions. After the first fast lookup table is created, the system can receive requests from the user terminal device, and based on the requests, create a second fast lookup table from the first fast lookup table to include more complete information. The creation of the second fast lookup table can be as part of background computing. Compared with the second fast index table, the first fast lookup table can have a coarse granularity and contains fewer entries. Therefore, the first fast lookup table may be regarded as a coarse granularity table, and the second fast lookup table may be regarded as a fine granularity table.

For the coarse granularity table, when the file allocation table is traversed, the information shown in Table 2 is created only for some cluster identifiers satisfying a preset condition, and the other cluster identifiers are neglected temporarily. For example, the root directory entry of the file allocation table stores the cluster identifiers of the first data unit of each file. Besides, as described before with Table 1, the FAT table stores a special end-of-file marker for the last data unit of each file. Thus, the cluster identifiers associated with the starting cluster (i.e. a cluster associated with the beginning of a file) and the ending cluster (i.e. a cluster associated with the end of a file) can be easily determined, even if the association between the starting and ending clusters are not yet determined. Accordingly, a coarse granularity table can be created for these clusters. Moreover, a coarse granularity table can be created to include only clusters associated with cluster identifiers that are separated by a certain interval (i.e. by a certain number of clusters). The interval can be a certain multiple of a difference between the cluster identifiers. For example, an interval of 100 can be used, so that the coarse granularity table only includes clusters associated with cluster numbers 100, 200, 300, and so on. The lookup information (e.g., the cluster identifier for the first date unit, etc.) for other clusters can be added later as part of the background computing. The same method can be used for acquiring the lookup information for both the coarse granularity table and the fine granularity table.

If neither the coarse granularity table nor the fine granularity table stores a cluster number that is currently being accessed, the system cannot locate the associated ending cluster and provide the identifier information of the associated content to the user terminal device. However, in practical situations the file data of the currently played media content is scattered and stored into a plurality of clusters. Therefore, typically at least one cluster associated with the file is stored in the coarse granularity table. Therefore, if the coarse granularity table also stores the ending cluster information, the system can locate the ending cluster associated with the file based on any of the clusters associated with the file, thereby acquiring the identifier information of the associated content in the file.

In some embodiments, the above fast index table can be created using other methods. For example, the system can monitor a writing operation on any data area, which can indicate that some media data is being written into the storage device. The fast lookup table can be created based on the change of the file allocation table, and then stored at a hidden sector of the storage device. In this way, once the storage device (or a system having direct access to the storage device) is plugged into the playback device and is powered on, the system can perform multi-screen interaction with the user terminal device with the created fast lookup table (e.g., by providing, on a different screen, additional information about a media content being displayed on a specific screen, after acquiring the additional information using the fast lookup table), without creating the fast index table once again after the storage device is powered on.

The fast lookup tables thus created enable efficient acquisition of file information. Such an arrangement can also maintain a certain level of performance in an environment where the internal memory has very limited space, for at least the following reasons.

First, a table-creating performance of the fast lookup table is analyzed. Each time when one partition in the file allocation table is read, a number of partitions (e.g., four) in a fast lookup table area can be written (index item contents are four times of file allocation table items). When a coarse granularity table is created, the system can adjust if index item contents are written or not according to cluster identifiers. For example, the system can control to write once each time after traversing 512 cluster identifiers. In this way, each time when one partition of the file allocation table is read, one index partition is written correspondingly. Thus, through this method, the system can only request a memory overhead of a size of one file allocation table partition (512 bytes) plus a size of four index partitions or one index partition (512 bytes or 2K), totally 2.5K. In some embodiments, the overhead for creating the coarse granularity table is 3 s-4 s in the case that the storage device stores 1.2G data.

Second, the fast lookup table also maintains a certain level of reading performance. When one cluster is read, the system can reversely derive information about its file associated with the cluster. According to embodiments of the present disclosure, accessing a cluster will lead to accessing a cluster number in the fast lookup table. Theoretically, in the worst scenario, the accessing speed of the storage device is reduced by 50%, since the number of accesses doubles, and the number of loading and swapping cluster data into and out of internal memory can double as well. However, the worst scenario is unlikely to happen. This is because file clusters in the FAT32 file system are generally arranged contagiously. Typically two clusters that are read successively belong to the same sector. Therefore, after the data of a sector is loaded into a memory for accessing a cluster, the sector data can remain in the internal memory for the next cluster access. Typically the sector data can be swapped out of the internal memory after 128 cluster reads (512 bytes/4 bytes). In the best scenario, a new sector needs to be read for every 128 cluster reads. Given that it is very rare that a file is not stored between any contagious clusters, the degradation in accessing speed is negligible.

In Step S103, based on the data unit stored in the second target cluster, the system determines the identifier information associated with the currently read media content.

After the system obtains the second target cluster that stores the identifier information, the system determines identifier information associated with the currently-read media content based on data stored in the second target cluster.

A person with ordinary skill in the art will understand that the names "media content" and "media file" refer to two concepts. "Media content" refers to details about the content being played, for example, an advertisement of a certain commodity, etc. On the other hand, the media file refers to a storage form for storing the media content into the storage device, for example, storing the media content into a file with an AVI form, etc.

In some cases, one media file may only store one media content. In this case, identifier information stored at, for example, a tail part of the media file can be the identifier information associated with the media content. Thus, as long as the system detects which media file is being played, system can also detect the currently played media content. The storage device can use the identifier information stored at the tail part of the media file to return a response to a party who sends the request.

However, in some cases, one media file may store a plurality of media contents. For example, a certain media file stores advertisements of a plurality of commodities. In this case, when a user is interested in certain specific media content, the identifier information provided to the user should correspond to that specific media content. Accordingly, the system needs to detect not only the media file, but also the specific media content that is being played.

In some embodiments, to enable detection of specific media content, identifier information associated with each piece of media content in the file can be attached as part of the file. The physical location information of each piece of media content in the media file can also be included in the file. Both the identifier information and the physical location information can be stored at the second target cluster. Accordingly, after the system detects a cluster identifier of the currently-read cluster (e.g., the first target cluster), the system can locate the cluster identifier of a specific cluster (e.g., the second target cluster) that is associated with the same media file as the currently-read cluster. Then, the system can determine, based on a data unit stored in the second target cluster, the physical location of each of the media contents within the media file, and their corresponding identifier information. The system can determine a target physical location, and then compare the target physical location against the physical location of each of the media contents to find a match. When the media content associated with the matching physical location is found, the system can then select the identifier information associated with that matching media content to be the identifier information associated with the currently-read media content.

For example, to determine a location of the currently-read data within the associated media file, the system can estimate the location based on the sequence number associated with a data unit stored at the first target cluster (the currently-read cluster). As an illustrative example, each cluster has a data capacity of 4 KB. The data unit stored at the first target cluster is associated with a sequence number of 4 in the associated media file. The system can then estimate that the data being assessed is located between the 12 KB and 16 KB locations in the media file data. The system can then determine, based on the descriptive information included in the data stored in the second target cluster, which media content is associated with the portion of data between the 12 KB and 16 KB locations in the media file data.

In some embodiments, when the media file stores a plurality of media contents, the file data may include identifier information associated with each of the media contents, and the physical location of each of the media contents in the media file. The fast lookup table can also store a sequence number associated with each data unit stored at each cluster, and associate the sequence number with the cluster identifiers. To obtain identifier information of the currently-read media content, embodiments of the present disclosure further provide the following method:

Firstly, the system determines, from the fast lookup table, a target sequence number associated with a data unit (associated with a media file) stored at a first target cluster.

Secondly, based on the target sequence number and the data capacity of each cluster, the system determines a physical location, within the media file, of that data unit stored at the first target cluster.

Thirdly, the system parses the data stored at a second target cluster to determine the physical location of each of the media contents within the media file, and the identifier information associated with each of the media contents.

Fourthly, the system compares the physical location of each of the media contents against the physical location of the data unit stored at the first target cluster to find a match. When the media content associated with the matching physical location is found, the system can then determine that the identifier information associated with that media content to be the identifier information associated with the currently-read media content.

Therefore, according to embodiments of the present disclosure, when the playback device reads the media file stored in the storage device, the storage device (or a system that have direct access to the storage device) can determine, based on information about a read operation of the data stored therein and the associated file allocation system (e.g. FAT), the identifier information associated with the currently read media content. Thus, the system can determine information about a reading progress of the media file, and provide the information, or other related information, to another party upon request.

There are many applications for the identifier information associated with the currently-read media content determined according to embodiments of the present disclosure. As an illustrative example, when a device connected to a large display screen engages in a multi-screen interaction with a user terminal device, the user terminal device may request for a certain content associated with the media content currently played on the large display screen. For example, the large screen can be displaying an advertisement about a certain product. When viewing the advertisement, the user may want to know more about the product, such as detailed description about the product, information about buying and storing the product, etc. In this case, the storage device which stores the media content for the advertisement (or a system that have direct access to the storage device) can determine first identifier information of the currently-read media content according to method 100 as described above. Based on a timing difference between the time the media content is read and the time the media content is played, the system can determine second identifier information associated with the media content being currently played (and displayed). The system can then transmit the second identifier information to the user terminal device as part of interactive content.

In some embodiments, the identifier information can be associated with other content related to the media content, such as a web address. In addition, each time the identifier information (e.g., the first identifier information) associated with the currently-read media content is determined, the system can also record a time when the media content associated with the first identifier is read. Meanwhile, the system can also include (or interface with) a wireless communication device. Accordingly, after receiving a request from a terminal device, the storage device can determine second identifier information associated with the media content being currently displayed, based on a timing difference between the time the media content is read and the time the media content is played, and based on the recorded reading time of the media content associated with the first identifier information. The system can then transmit wirelessly the second identifier information to the terminal device. The terminal device can then acquire other content related to the media content being played, such as detailed description and sales information about a product being displayed as part of the media content.

Figure 2:
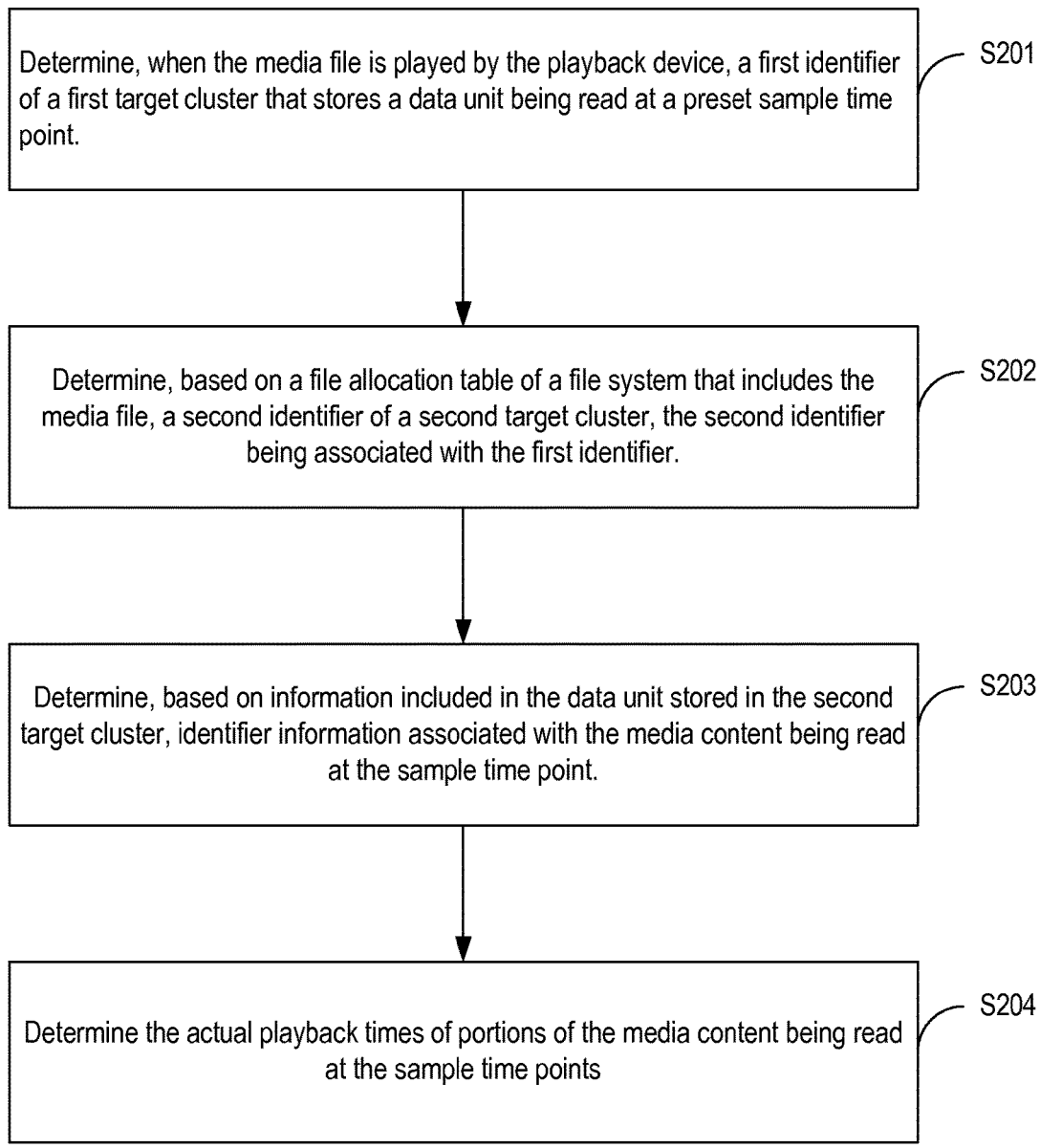
FIG. 2 is a flowchart of an exemplary method for determining information about a playing operation of a media file stored in the storage device.

Reference is now made to FIG. 2, which illustrates an exemplary method 200 for determining information about a playing operation of a media file stored in the storage device, according to embodiments of the present disclosure. When a playback device plays a media file stored in the storage device, generally the playback device reads some media contents into a buffer beforehand. And then, after it finishes playing the current media content, it starts to play the media contents in the buffer. Therefore, a reading time and an actual playback time may be different for a specific piece of media content data. In actual applications, the storage device may have to account for the difference when obtaining identifier information associated with the media content being played at a certain moment.

Method 200 provides a method for determining information about a playing operation of a media file stored in the storage device. Method 200 can be performed by a system which can be a storage device or have direct access to a storage device. The storage device includes a plurality of clusters and stores a media file to be played by a playback device. The media file includes data for media content and identifier information associated with the media content. The media file data includes a plurality of data units. Each of the data units is associated with a sequence number to reflect the sequence of the data units in the media file. The data units are stored and distributed among the plurality of clusters of the storage device. The identifier information associated with the media content can be stored in a pre-selected data unit associated with a pre-determined sequence number. Referring to FIG. 2, method 200 includes the following steps.

In Step S201, when the media file is played by the playback device, the system determines a first identifier of a first target cluster that stores a data unit being read at a preset sample time point.

In Step S202, the system determines, based on a file allocation table (e.g. FAT) of a file system that includes the media file, a second identifier of a second target cluster, the second identifier being associated with the first identifier. The data unit in the first target cluster and data units in the second target cluster are associated with the same target media file. The second target cluster stores the pre-selected data unit that includes the identifier information and is associated with the predetermined sequence number.

In Step S203, the system determines, based on information included in the data unit stored in the second target cluster, identifier information associated with the media content being read at the sample time point.

In some embodiments, after determining that a certain piece of media content is read at a certain time point, the system can add a certain amount of delay to the reading time point to determine the actual time point when the media content is actually played. Therefore, to determine the identifier information associated with the currently played media content, the system needs to determine a reading time of the media content before the time when the media content is played. Thus, according to embodiments of the present disclosure, the system can predetermine a plurality of sample time points. For example, from the time when the media file starts playing, the system can set a sample time point at every 5-second interval. The system can then determine the identifier information associated with the media content being read at each of the pre-determined sample time point. The determination of the identifier information can be implemented using the techniques described with respect to method 100 of FIG. 1 at each of the sample time points.

In Step S204, the system determines the actual playback times of portions of the media content being read at the sample time points, according to a time difference between a reading time and a playback time of the playback device.

After determining identifier information associated with the media content being currently read at the sample time point, an actual playback time of the media content being read at the sample time point can be determined according to a time difference between a reading time and a playback time of the playback device. In this way, the when the actual playback time arrives, the identifier information associated with the media content that is being played can be determined, by providing the identifier information associated with a sample time point that is separated from the current time by the known time difference.

There are numerous applications for the actual playback time determined according to embodiments of the present disclosure. As an illustrative example, a device with a large screen engages in a multi-screen interaction with a user terminal device, where the user terminal device can request for some contents associated with the media content currently being played at the large screen. For example, the large screen can be displaying an advertisement about a certain product. When viewing the advertisement, the user may want to know more about the product, such as detailed description about the product, information about buying and storing the product, etc. In this case, the storage device which stores the media content for the advertisement (or a system that have direct access to the storage device) can determine the identifier information of the media content that is read at each sample time point based on the method described in the above Step S201 to Step S204. Based on a timing difference between the time the media content is read and the time the media content is played, the system can determine identifier information associated with the media content being currently played (and displayed). The system can then transmit the identifier information to the user terminal device as part of interactive content.

In some embodiments, the identifier information can be associated with other content related to the media content, such as a web address. Meanwhile, the system can also include (or interface with) a wireless communication device. Accordingly, after receiving a request from a terminal device, the storage device can determine a target media content associated with a playback time point that matches the current time, and the identifier information associated with the target media content. The system can then transmit wirelessly the identifier information to the terminal device. The terminal device can then acquire other content related to the media content being played, such as detailed description and sales information about a product being displayed as part of the media content.

Figure 3:
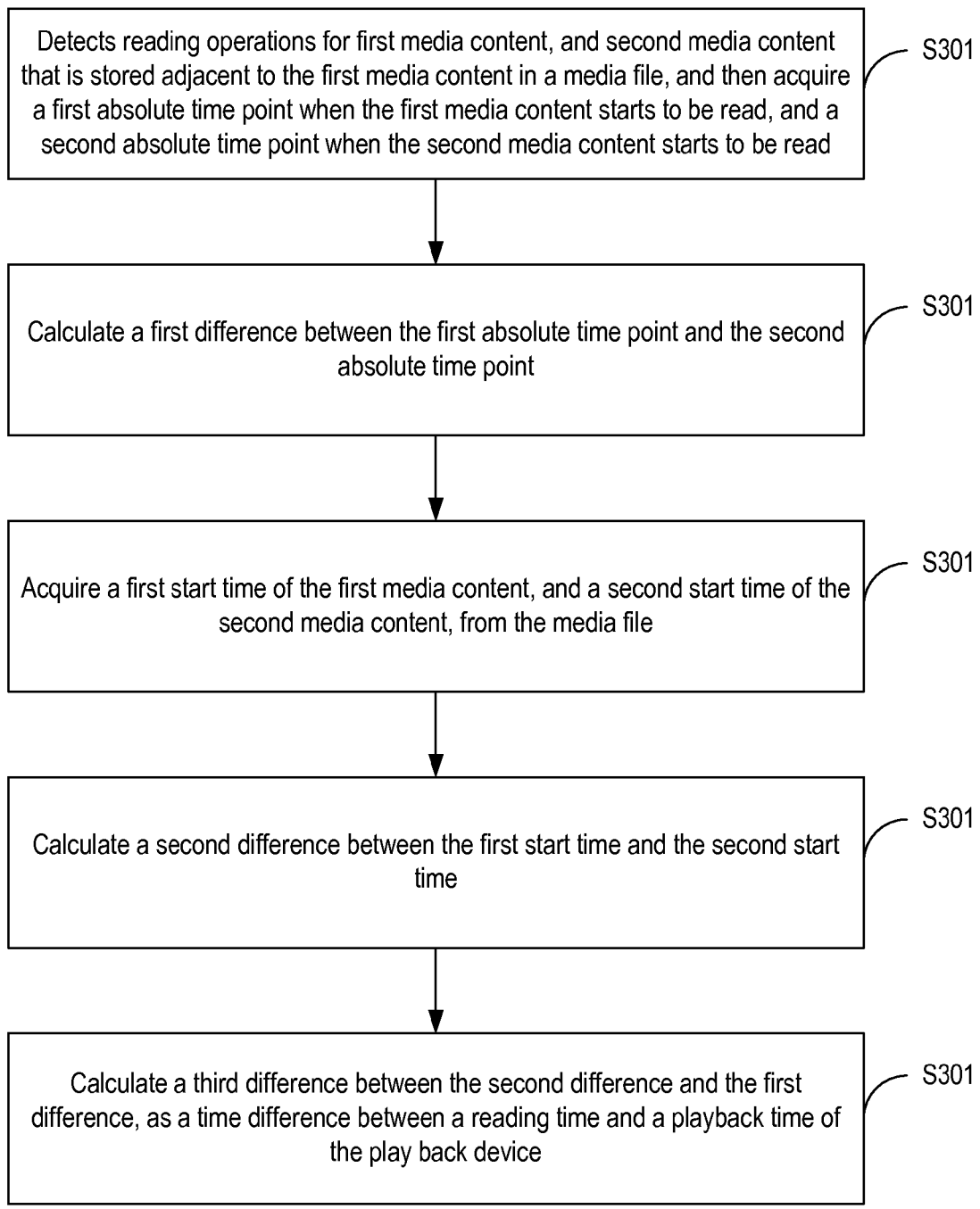
FIG. 3 is a flowchart of an exemplary method for determining playback times associated with a plurality of media contents stored in a media file, consistent with embodiments of the present disclosure.

Reference is now made to FIG. 3, which illustrates an exemplary method 300 for determining playback times associated with a plurality of media contents stored in a media file, according to embodiments of the present disclosure. A time difference between a reading time and a playback time of the playback device can be determined in various ways. For example, it may be determined based on an experimental value. But a single experimental value may not work for different playback devices, because they can exhibit different time differences. For example, different playback devices can prefetch different sizes of content before playing, which can affect the time differences. Method 300 can be used to directly measure the time difference at the playback device, based on the start time information associated with each of the media contents. Method 300 can be performed by a system which can be a storage device or have direct access to a storage device. The storage device stores a media file to be played by a playback device, and the media file stores the data for a plurality of media contents, identifier information associated with each of the media contents, and the start time information associated with each of the media contents. Referring to FIG. 3, method 300 includes the following steps.

In Step S301, the system detects reading operations for first media content, and second media content that is stored adjacent to the first media content in a media file. The system acquires a first absolute time point when the first media content starts to be read, and a second absolute time point when the second media content starts to be read.

In Step S302, the system calculates a first difference between the first absolute time point and the second absolute time point.

In Step S303, the system acquires a first start time of the first media content, and a second start time of the second media content, from the media file. The information can be included in the data unit stored at the second target cluster. That data unit can store the description information of the media file, including the start time information.

In Step S304, the system calculates a second difference between the first start time and the second start time.

In Step S305, the system calculates a third difference between the second difference and the first difference. The third difference thus calculated can represent the time difference between a reading time and a playback time of the playback device.

For example, it is assumed that A and B are two pieces of adjacent media contents in the media file; Time1 is an absolute time point when it is detected that the media content A is being read; Time1_1 is a start time point of the media content A recorded in the data; Time2 is an absolute time point when it is detected that media content B is being read; and Time2_2 is a start time point of the media content B recorded in the data. The time difference caused by buffering is described as follows:

(Time2_2−Time1_1)−(Time2−Time1)

That is, the actual start playback time of the media content B is equal to (Time2+Time Difference). Actual start playback time for the other media contents may also be modified accordingly.

For example, it is assumed that the absolute time point Time1 when the media content A starts to be read is at 10:00, and the absolute time point Time2 when the media content B starts to be read is at 10:02. As recorded in description information of the media file, a start time point for the media content A is at 2 minute (relative to the start time of the media file), and a start time point for the media content B is at 4 minutes and 10 seconds (also relative to the start time of the media file). Therefore, the actual time duration for the media content A is 2 minutes and 10 seconds. Therefore, the actual time duration exceeds the difference between the absolute time points of reading by 10 seconds. Thus, it can be calculated that a time difference caused by buffering is 10 seconds. Subsequently, when the system detects that certain media content starts to be read at a certain reading time point, the system can estimate the actual playing time of that media content starts at 10 seconds after the reading time point.

Through the above process, the time difference between a reading time and a playback time can be determined according to the actual playback device, such that the obtained data is more precise, which is helpful for determining the actual playback time of the media contents more accurately based on the currently read media contents.

Figure 4:
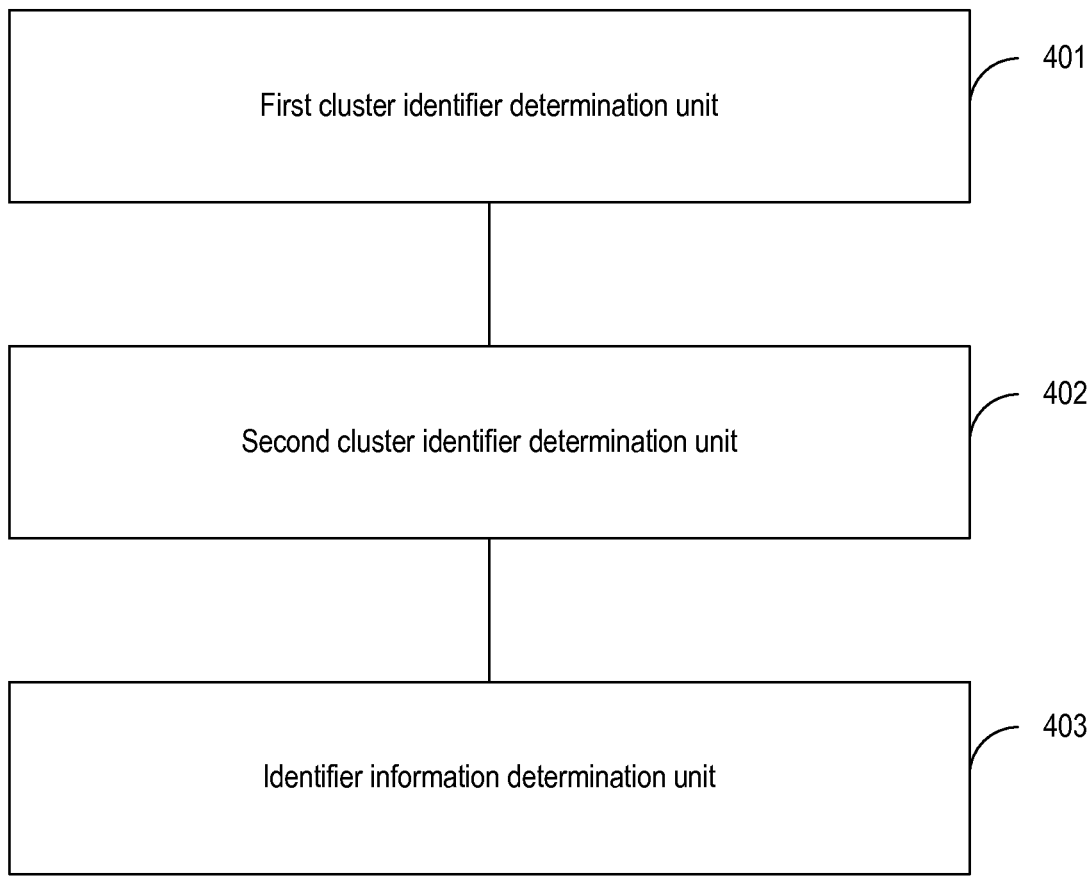
FIG. 4 is a block diagram of an exemplary apparatus for determining media information associated with data being accessed from a storage device, consistent with embodiments of the present disclosure.

FIG. 4 is a block diagram of an exemplary apparatus 400 for determining media information associated with data being accessed from a storage device, consistent with embodiments of the present disclosure. The apparatus can be coupled with a storage device, or be part of the storage device. The storage device includes a plurality of clusters. A media file includes data for media content and identifier information associated with the media content. The media file data includes a plurality of data units. Each of the data units is associated with a sequence number to reflect the sequence of the data units in the media file. The data units are stored and distributed among the plurality of clusters of the storage device. The identifier information associated with the media content can be stored in a pre-selected data unit associated with a pre-determined sequence number. Referring to FIG. 4, apparatus 400 includes the following units: a first cluster identifier determination unit 401, a second cluster identifier determination unit 402, and an identifier information determination unit 403.

First cluster identifier determination unit 401 is configured to determine a first identifier of a first target cluster where a currently read data unit is stored.

Second cluster identifier determination unit 402 is configured to determine, based on a file allocation table (e.g. FAT) of a file system, a second identifier associated with a second target cluster, the second identifier being associated with the first identifier. The data units stored in the first target cluster and the second target cluster are associated with the same media file, and the second target cluster stores the data unit associated with the predetermined sequence number.

Identifier information determination unit 403 is configured to determine identifier information associated with the currently read media content according to the data unit stored by the second target cluster.

In some embodiments, to determine the identifier of the second target cluster more conveniently, the apparatus further includes a fast lookup table creation unit.

The fast lookup table creation unit is configured to create a fast lookup table beforehand according to the file allocation table. Each entry in the fast lookup table can store a target cluster identifier (e.g., a cluster number) that is associated with each of the cluster identifiers, and for each entry, the data units associated with the cluster identifier belong to the same media file. The target cluster (associated with the target cluster identifier) stores the data unit associated with the predetermined sequence number (that is, the data unit that stores the identifier information associated with the media content).

In some embodiments, the second cluster identifier determination unit is further configured to determine the second identifier associated with the first identifier with the fast lookup table created beforehand.

The identifier information associated with the media content is stored in the last data unit of the media file.

In some embodiments, the fast index table creation unit further includes the following sub-units: a traverse sub-unit, a start cluster sub-unit, and an end cluster recording sub-unit.

The traverse sub-unit is configured to traverse the file allocation table to determine a start cluster identifier of every media file associated with each of the cluster identifiers. The start cluster is used for storing a first data unit of the media file.

The start cluster recording sub-unit configured to record the start cluster identifier of the media file associated with each cluster identifier in a first field of the entry where the corresponding cluster identifier is located.

The end cluster recording sub-unit is configured to, if a certain cluster identifier is determined as an end cluster of the corresponding media file during traversing, record the cluster identifier into a second field of the entry where the start cluster of the media file is located. The end cluster is used for storing the last data unit of the corresponding media file.

In some embodiments, the second cluster identifier determination unit further includes the following sub-units: a first entry determination sub-unit, a start cluster determination sub-unit, a second entry determination sub-unit, and an end cluster determination sub-unit.

The first entry determination sub-unit is configured to determine a first target entry where the first target cluster identifier is stored.

The start cluster determination sub-unit is configured to determine a start cluster identifier of the media file associated with the first target cluster based on the first field of the first target entry.

The second entry determination sub-unit is configured to determine a second target entry where the start cluster identifier is stored.

The end cluster determination sub-unit is configured to determine an end cluster identifier of the media file associated with the first target cluster based on the second field of the second target entry, and to determine the end cluster identifier as the second target cluster identifier.

In some embodiments, the fast lookup table creation unit further includes the following sub-units: a first fast lookup table creation sub-unit, and a second fast lookup table creation sub-unit.

The first fast lookup table creation sub-unit is configured to create a first fast lookup table for cluster identifiers satisfying a preset condition;

The second fast lookup table creation sub-unit is configured to create a second fast index table for other cluster identifiers by means of background computation, after the first fast index table is created.

In some embodiments, the first fast lookup table creation sub-unit is also configured to create the first fast index table to include cluster identifiers associated with a start cluster or an end cluster.

In some embodiments, the first fast lookup table creation sub-unit is also configured to acquire cluster identifiers according to a preset interval, and create the first fast index table with the acquired cluster identifiers.

In some embodiments, the fast lookup table creation unit further includes the following sub-units: a monitoring sub-unit and a table creation sub-unit.

The monitoring sub-unit is configured to monitor a writing operation in the data area.

The table creation sub-unit is configured to create the fast index table based on change of the file allocation table (e.g. FAT) when data is found to be written into certain data area.

The data of the media file includes data of a plurality of media contents, identifier information associated with each piece of media content, and physical location information of each of the media contents in the media file. The fast lookup table further stores a sequence number associated with the data unit.

In some embodiments, the identifier information determination unit further includes: a sequence number determination sub-unit, a physical position determination sub-unit, a first media content description determination sub-unit, a first matching computation sub-unit, and a first determination sub-unit.

The sequence number determination sub-unit is configured to determine a target sequence number associated with the data unit stored at the first target cluster associated with a media file, according to the fast lookup table.

The physical position determination sub-unit is configured to determine a target physical location of the data unit within the media file, according to the target sequence number and the data capacity of a single cluster.

The first media content description determination sub-unit is configured to determine the physical location of each of the media contents in the media file, and identifier information associated with each of the media contents, based on information included in the data units in the second target cluster.

The first matching computation sub-unit is configured to compare the target physical location against the physical locations of each of the media contents, to find a match.

The first determination sub-unit is configured to, responsive to finding the media content associated with the matching physical location, determine identifier information associated with the matching media content as the identifier information associated with the currently-read media content.

The data of the media file includes data of a plurality of media content, identifier information respectively associated with each of the media contents, and physical locations of each of the media contents in the media file.

In some embodiments, the apparatus further includes a physical location determination unit configured to determine a target physical location of the data unit stored at the first target cluster within the associated media file, according to the file allocation table (e.g. FAT) in the file system.

In some embodiments, the identifier information determination unit further includes: a second media content description determination sub-unit, a second matching computation sub-unit, and a second determination sub-unit.

The second media content description determination sub-unit is configured to determine the physical location of each of the media contents in the media file, and identifier information associated with each of the media contents, based on information included in the data units stored in the second target cluster.

The second matching computation sub-unit is configured to compare the target physical location (determined by physical location determination unit) against the physical locations of each of the media contents, to find a match.

The second determination sub-unit is configured to, responsive to finding the media content associated with the matching physical location, determine identifier information associated with the matching media content as the identifier information associated with the currently-read media content.

In some embodiments, the identifier information associated with the media content further includes: identifier information of a piece of content related to the media content.

In some embodiments, the apparatus interfaces with or includes a wireless communication device, and the apparatus further comprises a reading time record unit configured to record a reading time associated with the identifier information of the currently read media content.

In some embodiments, after receiving, from a terminal device, a request for acquiring identifier information of a piece of content related to the media content being currently played, the apparatus is configured determine the identifier information of the related content based on a time difference between a reading time and a playback time of the media content and the recorded reading time, and transmit the determined identifier information to the terminal device wirelessly.

Figure 5:
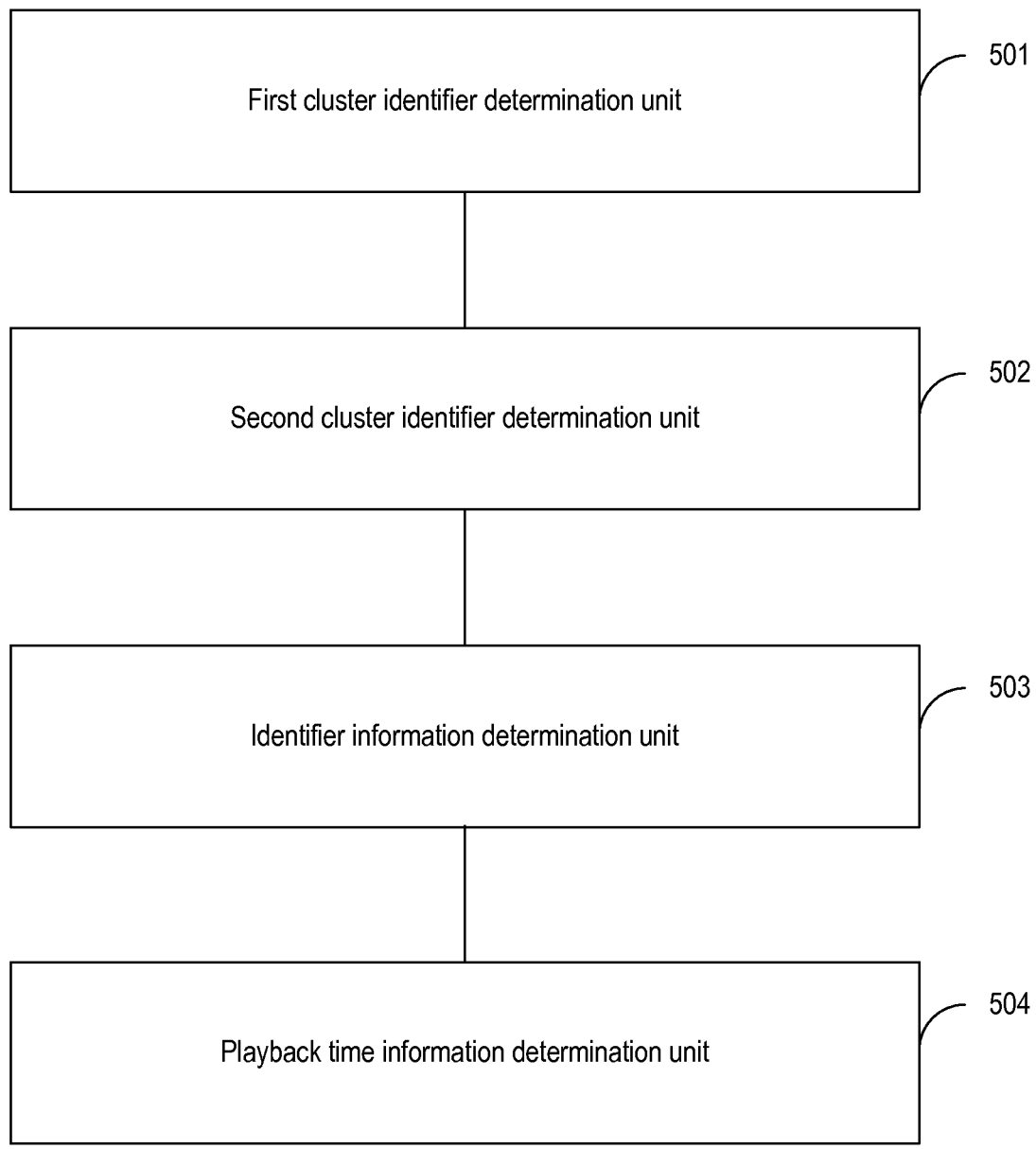
FIG. 5 is a block diagram of an exemplary apparatus for determining media information associated with data being accessed from a storage device, consistent with embodiments of the present disclosure.

FIG. 5 is a block diagram of an exemplary apparatus 500 for determining information about a playing operation of a media file stored in the storage device. The apparatus can be coupled with a storage device, or be part of the storage device. The storage device includes a plurality of clusters and stores a media file to be played by a playback device. The media file includes data for media content and identifier information associated with the media content. The media file data includes a plurality of data units. Each of the data units is associated with a sequence number to reflect the sequence of the data units in the media file. The data units are stored and distributed among the plurality of clusters of the storage device. The identifier information associated with the media content can be stored in a pre-selected data unit associated with a pre-determined sequence number. Referring to FIG. 5, apparatus 500 includes the following units: a first cluster identifier determination unit 501, a second cluster identifier determination unit 502, and an identifier information determination unit 503, and a playback time information determination unit 504.

First cluster identifier determination unit 501 is configured to determine a first identifier of a first target cluster that stores a data unit being read at a preset sample time point;

Second cluster identifier determination unit 502 is configured to determine, based on a file allocation table (e.g. FAT) of a file system, a second identifier of a second target cluster, the second identifier being associated with the first identifier. The data unit in the first target cluster and data units in the second target cluster are associated with the same target media file. The second target cluster stores the data unit with the predetermined sequence number.

Identifier information determination unit 503 is configured to determine, based on information included in the data unit stored in the second target cluster, identifier information associated with the media content being read at the sample time point.

Playback time information determination unit 504 is configured to determine the actual playback times of the portion of media content being read at the sample time points, according to a time difference between a reading time and a playback time of the playback device.

The identifier information associated with the media content includes identifier information of a piece of associated content associated with the media content.

In some embodiments, the apparatus also includes or interfaces with a wireless communication device. After receiving, from a terminal device, a request for acquiring identifier information of a piece of content related to media content being currently played media content, the apparatus is configured to determine a target media content associated with a playback time point that matches with the current time. The apparatus is further configured to transmit the identifier information associated with the target media content wirelessly.

Figure 6:
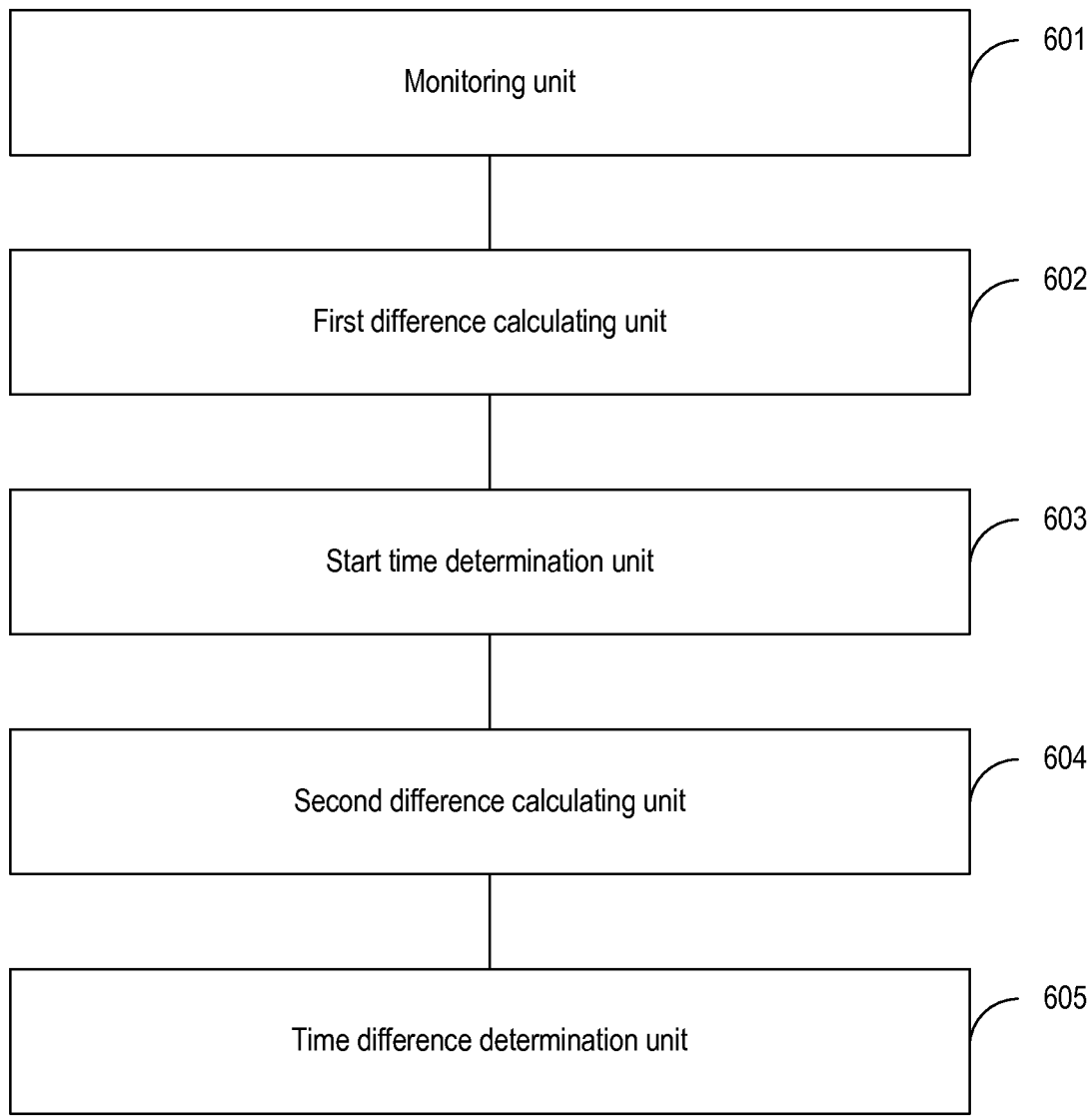
FIG. 6 is a block diagram of an exemplary apparatus for determining playback times associated with a plurality of media contents stored in a media file, consistent with embodiments of the present disclosure.

FIG. 6 is a block diagram of an exemplary apparatus 600 for determining playback times associated with a plurality of media contents stored in a media file, according to embodiments of the present disclosure. The apparatus can be coupled with a storage device, or be part of the storage device. The storage device stores a media file to be played by a playback device, and the media file stores the data for a plurality of media contents, identifier information associated with each of the media contents, and the start time information associated with each of the media contents. Referring to FIG. 6, apparatus 600 includes the following units: a monitoring unit 601, a first difference calculation unit 602, a start time determination unit 603, a second difference calculation unit 604, and a time difference determination unit 605.

Monitoring unit 601 is configured to detect reading operations for first media content, and second media content that is stored adjacent to the first media content in a media file. Monitoring unit 601 is also configured to acquire a first absolute time point when a first media content starts to be read, and a second absolute time point when a second media content starts to be read.

First difference calculation unit 602 is configured to calculate a first difference between the first absolute time point and the second absolute time point.

Start time determination unit 603 is configured to determine a first start time of the first media content, and a second start time of the second media content, from the media file. The information can be included in the data unit stored at the second target cluster. That data unit can store the description information of the media file, including the start time information.

Second difference calculation unit 604 is configured to calculate a second difference between the first start time and the second start time.

Time difference determination unit 605 is configured to determine a third difference between the second difference and the first difference. The third difference thus calculated can represent a time difference between a reading time and a playback time of the playback device.

As will be understood by those skilled in the art, embodiments of the present invention may be embodied as a method, a system or a computer program product. Accordingly, the present invention may take the form of an entirely hardware embodiment, an entirely software embodiment or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

The present invention is described with reference to flow diagrams and/or block diagrams of methods, devices (systems) and computer program products according to embodiments of the present invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory.

The memory may include forms of a volatile memory, a random access memory (RAM) and/or non-volatile memory and the like, such as a read-only memory (ROM) or a flash. RAM in a computer readable medium. The memory is an example of the computer readable medium.

The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. According to the definition of the context, the computer readable medium does not include transitory media, such as modulated data signals and carrier waves.

It will be further noted that the terms "comprises", "comprising" or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity or device. Therefore, the element defined by a sentence "comprising a . . . " does not preclude the presence of other same elements in the process, method, commodity or device including said elements under the condition of no more limitations.

As will be understood by those skilled in the art, embodiments of the present invention may be embodied as a method, a system or a computer program product. Accordingly, the present invention may take the form of an entirely hardware embodiment, an entirely software embodiment or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A computer-implemented method for determining identifier information associated with media content stored in a storage device; the method comprising:

determining, when a data unit is read from the storage device, a first identifier associated with a first target cluster that stores the data unit being read, wherein the storage device comprises a plurality of clusters, having the first target cluster and a second target cluster, and stores a media file including the media content and the identifier information associated with the media content, the media content and the identifier information being stored in a plurality of data units distributed among the plurality of clusters, wherein the plurality of data units is associated with sequence numbers, and the sequence numbers indicate an order of the data units in the media file;

determining a second identifier associated with the first identifier according to the sequence numbers, the second identifier being associated with the second target cluster that stores a data unit containing the identifier information; and obtaining, based on the second identifier, the identifier information associated with the media content.

2. The method of claim 1, further comprising creating a lookup table; wherein the lookup table stores identifiers associated with at least some of the plurality of clusters; wherein the lookup table also stores the second identifier; wherein at least one of the identifiers is associated with the second identifier in the lookup table.

3. The method of claim 2, where creating a lookup table comprises:

traversing a file allocation table to acquire the identifiers;

associating one of the identifiers with each of the identifiers in the lookup table; and associating the second identifier with the one of the identifiers; and wherein the determining a second identifier associated with the first identifier comprises:

locating the one of the identifiers in the lookup table based on the first identifier; and locating the second identifier in the lookup table based on the one of the identifiers.

4. The method of claim 3, wherein creating the lookup table comprises:

detecting a writing operation at the storage device;

responsive to the detection of writing operation, detecting one or more changes in the file allocation table; and updating the lookup table to reflect the one of more changes in the file allocation table.

5. The method of claim 2, wherein the identifiers include a third identifier and a fourth identifier; wherein the third identifier is associated with a cluster that stores a data unit at a head location of the media file; and wherein the fourth identifier is associated with a cluster that stores a data unit included in a tail location of the media file.

6. The method of claim 2, wherein each of the at least some of the plurality of clusters is separated by a predetermined number of clusters.

7. The method of claim 2, wherein the plurality of data units contain a plurality of media contents; wherein the data unit that contains identifier information associated with the plurality of media contents also contains information about the physical locations of the plurality of media contents in the media file; wherein each of the data units of the media file is associated with a sequence number, the sequence number indicating an order of the data units in the media file; wherein the lookup table stores the sequence numbers; wherein the method further comprises:

determining, from the lookup table, a first sequence number associated with the data unit being read;

determining a first physical location of the data unit being read based on the first sequence number and a data capacity of a cluster;

comparing the physical locations of the plurality of media contents against the first physical location to find a match; and obtaining the identifier information associated with the matching media content.

8. The method of claim 1, further comprising:

determining a first physical location of the data unit being read based on a location of the first target cluster in a file allocation table, wherein the plurality of data units contain a plurality of media contents; wherein the data unit that contains identifier information associated with the plurality of media contents also contains information about the physical locations of the plurality of media contents in the media file; wherein each of the data units of the media file is associated with a sequence number, the sequence number indicating an order of the data unit in the media file; wherein the lookup table stores the sequence numbers;

comparing the physical locations of the plurality of media contents against the first physical location to find a match; and obtaining the identifier information associated with the matching media content.

9. The method of claim 1, further comprising:

recording a reading time associated with the reading of the data unit;

determining a time difference between a reading and a playing of the media file;

determining a data unit being played based on the recorded reading time, and the determined time difference; and obtaining identifier information associated with the data unit being played.

10. The method of claim 1, further comprising:

determining information associated with the media content based on the identification information; and transmitting the information in response for a request for information associated with the media content.

11. An apparatus for determining identifier information associated with media content stored in a storage device; the apparatus comprising a processor being configured to:

determine, when a data unit is read, a first identifier associated with a first target cluster that stores the data unit being read, wherein the storage device comprises a plurality of clusters, having the first target cluster and a second target cluster, and stores a media file including the media content and the identifier information associated with the media content, the media content and the identifier information being contained in a plurality of data units distributed among the plurality of clusters, wherein the plurality of data units is associated with sequence numbers, and the sequence numbers indicate an order of the data units in the media file;

determine a second identifier associated with the first identifier according to the sequence numbers, the second identifier being associated with the second target cluster that stores a data unit that contains the identifier information; and obtain, based on the second identifier, the identifier information associated with the media content.

12. A non-transitory computer readable medium storing a set of instructions executable by one or more processors of a computing device to cause the computing device to perform a method for determining identifier information associated with media content stored in a storage device, the method comprising:
  determining, when a data unit is read, a first identifier associated with a first target cluster that stores the data unit being read, wherein the storage device comprises a plurality of clusters, having the first target cluster and a second target cluster, and stores a media file including the media content and the identifier information associated with the media content, the media content and the identifier information being stored in a plurality of data units distributed among the plurality of clusters, wherein the plurality of data units are associated with sequence numbers, and the sequence numbers indicate an order of the data units in the media file;
  determining a second identifier associated with the first identifier according to the sequence numbers, the second identifier being associated with the second target cluster that stores a data unit containing the identifier information; and
  obtaining, based on the second identifier, the identifier information associated with the media content.

13. The non-transitory computer readable medium of claim 12, wherein the set of instructions executable by the one or more processors of the computing device to cause the computing device to further perform:
  creating a lookup table, wherein the lookup table stores identifiers associated with at least some of the plurality of clusters and stores the second identifier and wherein at least one of the identifiers is associated with the second identifier in the lookup table.

14. The non-transitory computer readable medium of claim 13, wherein creating a lookup table comprises:
  traversing a file allocation table to acquire the identifiers;
  associating one of the identifiers with each of the identifiers in the lookup table; and
  associating the second identifier with the one of the identifiers; and
  wherein the determining a second identifier associated with the first identifier comprises:
  locating the one of the identifiers in the lookup table based on the first identifier; and
  locating the second identifier in the lookup table based on the one of the identifiers.

15. The non-transitory computer readable medium of claim 14, wherein creating the lookup table comprises:
  detecting a writing operation at the storage device;
  responsive to the detection of writing operation, detecting one or more changes in the file allocation table; and
  updating the lookup table to reflect the one or more changes in the file allocation table.

16. The non-transitory computer readable medium of claim 13, wherein the identifiers include a third identifier and a fourth identifier; wherein the third identifier is associated with a cluster that stores a data unit at a head location of the media file; and wherein the fourth identifier is associated with a cluster that stores a data unit included in a tail location of the media file.

17. The non-transitory computer readable medium of claim 13, wherein each of the at least some of the plurality of clusters is separated by a pre-determined number of clusters.

18. The non-transitory computer readable medium of claim 13, wherein the set of instructions executable by the one or more processors of the computing device to cause the computing device to further perform:
  determining, from the lookup table, a first sequence number associated with the data unit being read, wherein the plurality of data units contain a plurality of media contents; wherein the data unit that contains identifier information associated with the plurality of media contents also contains information about the physical locations of the plurality of media contents in the media file; wherein each of the data units of the media file is associated with a sequence number, the sequence number indicating an order of the data units in the media file; wherein the lookup table stores the sequence numbers;
  determining a first physical location of the data unit being read based on the first sequence number and a data capacity of a cluster;
  comparing the physical locations of the plurality of media contents against the first physical location to find a match; and
  obtaining the identifier information associated with the matching media content.

19. The non-transitory computer readable medium of claim 12, wherein the set of instructions executable by the one or more processors of the computing device to cause the computing device to further perform:
  determining a first physical location of the data unit being read based on a location of the first target cluster in a file allocation table, wherein the plurality of data units contain a plurality of media contents; wherein the data unit that contains identifier information associated with the plurality of media contents also contains information about the physical locations of the plurality of media contents in the media file; wherein each of the data units of the media file is associated with a sequence number, the sequence number indicating an order of the data unit in the media file; wherein the lookup table stores the sequence numbers;
  comparing the physical locations of the plurality of media contents against the first physical location to find a match; and
  obtaining the identifier information associated with the matching media content.

20. The non-transitory computer readable medium of claim 12, wherein the set of instructions executable by the one or more processors of the computing device to cause the computing device to further perform:
  recording a reading time associated with the reading of the data unit;
  determining a time difference between a reading and a playing of the media file;
  determining a data unit being played based on the recorded reading time, and the determined time difference; and
  obtaining identifier information associated with the data unit being played.

21. The non-transitory computer readable medium of claim 12, wherein the set of instructions executable by the one or more processors of the computing device to cause the computing device to further perform:
  determining information associated with the media content based on the identification information; and
  transmitting the information in response for a request for information associated with the media content.

* * * * *